US012668361B1

(12) United States Patent
Miller et al.

(10) Patent No.: US 12,668,361 B1
(45) Date of Patent: Jun. 30, 2026

(54) RETRACTABLE WEAPON BAY DOOR MECHANISM

(71) Applicant: Government of the United States as represented by the Secretary of the Air Force, Kirtland AFB, NM (US)

(72) Inventors: Matthew Thomas Miller, Tallahassee, FL (US); Chung-Jen Tam, Albuquerque, NM (US)

(73) Assignee: United States of America as represented by the Secretary of the Air Force, Kirtland AFB, NM (US)

( * ) Notice: Subject to any disclaimer, the term of this patent is extended or adjusted under 35 U.S.C. 154(b) by 115 days.

(21) Appl. No.: 18/920,981

(22) Filed: Oct. 21, 2024

(51) Int. Cl.
B64D 1/06 (2006.01)
B64D 47/00 (2006.01)
E05D 15/10 (2006.01)

(52) U.S. Cl.
CPC .............. B64D 1/06 (2013.01); B64D 47/00 (2013.01); E05D 15/1042 (2013.01); *E05Y 2201/688* (2013.01); *E05Y 2900/502* (2013.01)

(58) Field of Classification Search
CPC ...................................................... B64D 1/06
USPC ........................................................ 89/1.51
See application file for complete search history.

(56) References Cited

U.S. PATENT DOCUMENTS

| | | | | |
|---|---|---|---|---|
| 4,930,398 A * | 6/1990 | Sharples | ............... | B64C 1/1407 89/1.51 |
| 6,536,711 B1 * | 3/2003 | Conway, Jr. | .............. | B64C 3/48 244/129.5 |
| 6,663,047 B1 * | 12/2003 | Arata | ....................... | B64D 1/06 89/1.51 |
| 9,567,059 B2 * | 2/2017 | Scimone | ............... | B64C 1/1407 |
| 10,486,813 B2 * | 11/2019 | Zaetterqvist | ........... | F41F 3/077 |

OTHER PUBLICATIONS

CN 104890876 A (Chinese Patent Publication and English Translation) (Year: 2015).*

* cited by examiner

*Primary Examiner* — Reginald S Tillman, Jr.
(74) *Attorney, Agent, or Firm* — AFNWC/JA; David L. Narciso, Sr.

(57) ABSTRACT

Various embodiments are directed to a weapon bay door mechanism configured to fully retract weapon bay doors into the weapon bay such that a fixed or turret-mounted optical, laser, or directed energy weapon or device deployed therefrom benefits from 360° line of sight (side-to-side view) of the surroundings beneath the aircraft once the turret is extended outside the aircraft's weapon bay. The weapon bay door mechanism retracts the doors inside the body of the aircraft and stows them within its bay, thereby providing 360° line of sight and reducing the aerodynamic drag associated with conventionally opening weapon bay doors.

14 Claims, 3 Drawing Sheets

RETRACTABLE WEAPON BAY DOOR MECHANISM

GOVERNMENT INTEREST

The invention described herein may be manufactured and used by or for the Government of the United States for all governmental purposes without the payment of any royalty.

FIELD OF THE DISCLOSURE

The present disclosure relates generally to a weapon bay door mechanism for stealth fighter and bomber aircrafts.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Conventional weapon bay designs for stealth bomber and fighter aircraft include a pair of access doors that open outwards and toward respective sides of the airframe to enable deployment of weapons disposed therein. While such doors do not hinder deployment of weapons such as bombs, missiles and the like, they are not suitable for optical/laser turret applications since they obstruct the line of sight for optical surveillance and laser weapon systems toward the respective sides of the airframe. That is, conventional weapon bay door design disadvantageously limits the viewing angles for optical/laser applications.

SUMMARY OF THE INVENTION

Various embodiments are directed to a weapon bay door mechanism configured to fully retract weapon bay doors into the weapon bay such that a fixed or turret-mounted optical, laser, or directed energy weapon or device deployed therefrom benefits from 360° line of sight (side-to-side view) of the surroundings beneath the aircraft once the turret is extended outside the aircraft's weapon bay. The weapon bay door mechanism retracts the doors inside the body of the aircraft and stows them within its bay, thereby providing 360° line of sight and reducing the aerodynamic drag associated with conventionally opening weapon bay doors.

A weapon bay door mechanism according to an embodiment comprises: a weapon bay door configured to secure an aperture in an aircraft fuselage associated with a weapon bay and comprising a forward door hinged to a rearward door, each of the forward and rearward doors comprising a leading edge, a trailing edge, a left side, and a right side; each of the doors having side-mounted thereon a pair of leading edge rollers and a pair of trailing edge rollers, the rearward door pair of trailing edge rollers have a smaller diameter than the other rollers; a sliding mechanism configured to retract the weapon bay door toward the inside rear of the aircraft fuselage, the sliding mechanism comprising a first pair of guiderails configured to cooperate with the larger diameter roller pairs and a second pair of guiderails configured to only cooperate with the smaller diameter roller pair; wherein the second guiderail pair is shaped to guide the pair of rearward door trailing edge rollers upward by an amount sufficient to raise an outer surface of the rearward door into an interior space in the fuselage and rearward by an amount sufficient to enable deployment of a weapon bay device.

A retrofit weapon bay door mechanism kit according to an embodiment comprises: a forward door configured to be connected by a hinge to a rearward door to form thereby a weapon bay door to secure an aperture in an aircraft fuselage associated with a weapon bay, each of the forward and rearward doors comprising a leading edge, a trailing edge, a left side, and a right side; three pairs of larger rollers and a pair of smaller rollers, the first and second pairs of larger rollers being configured for side-mounted thereon on the leading and trailing edge of the forward door, the third pair of larger rollers being configured for side-mounted thereon on the leading edge of the rearward door, and the pair of smaller rollers being configured for side-mounted thereon on the trailing edge of the rearward door; a sliding mechanism configured to be coupled to the inside of the aircraft fuselage so as to retract thereby the weapon bay door toward the inside rear of the aircraft fuselage, the sliding mechanism comprising a first pair of guiderails configured to cooperate with the larger diameter roller pairs and a second pair of guiderails configured to only cooperate with the smaller diameter roller pair; wherein the second guiderail pair is shaped to guide the pair of rearward door trailing edge rollers upward by an amount sufficient to raise an outer surface of the rearward door into an interior space in the fuselage and rearward by an amount sufficient to enable deployment of a weapon bay device.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

Figures 1, 2:
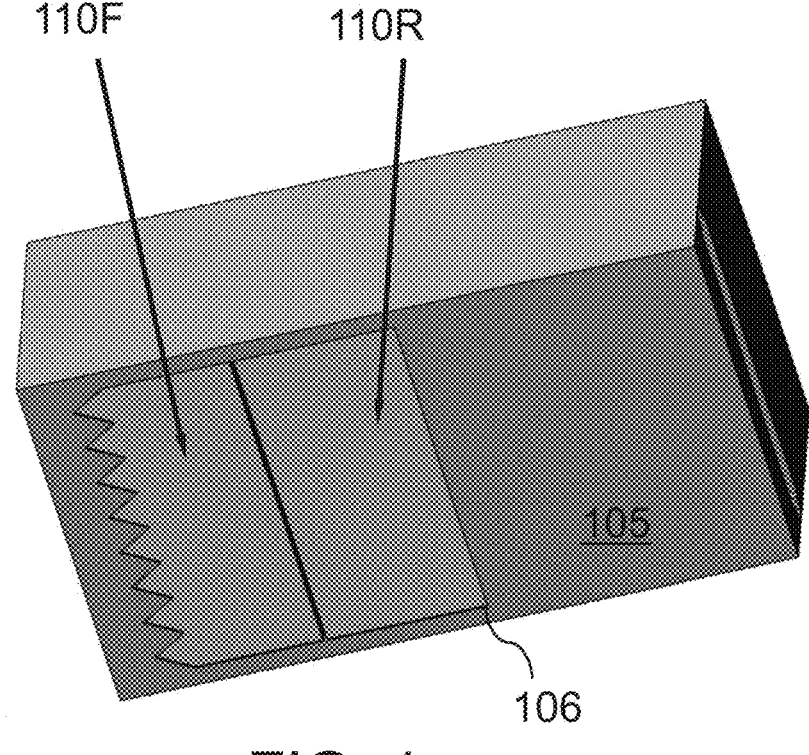
FIG. 1 depicts a fuselage view of a pair of cooperating weapon bay doors according to an embodiment in a closed position.
FIG. 2 illustrates the pair of cooperating weapon bay doors of FIG. 1.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

The following description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for illustrative purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others. Those skilled in the art and informed by the teachings herein will realize that the invention is also applicable to various other technical areas or embodiments, such as seismology and data fusion.

Various embodiments are directed to a weapon bay door mechanism configured to fully retract weapon bay doors into the weapon bay such that a fixed or turret-mounted optical, laser, or directed energy weapon or device deployed therefrom benefits from 360° line of sight (side-to-side view) of the surroundings beneath the aircraft once the turret is extended outside the aircraft's weapon bay. The weapon bay door mechanism retracts the doors inside the body of the aircraft and stows them within its bay, thereby providing 360° line of sight and reducing the aerodynamic drag associated with conventionally opening weapon bay doors. While the various embodiments find particular utility within the context of stealth fighters and bombers, the disclosed weapon bay door mechanism may be used with non-stealth aircraft and other platforms.

Various embodiments may be configured to reduce or eliminate door jamming, such as via the use of a slanted interior fuselage surface and rollers of differing sizes to prevent the rollers from engaging with incorrect rails.

Various embodiments may be configured to be compatible with the zig-zag edges of a weapon bay so as to maintain an aircraft's stealth capability. Various embodiments may be implemented as a retrofit kit so as to be retrofitted into existing bomber and fighter weapon bay configurations.

FIG. 1 depicts a fuselage view of a pair of cooperating weapon bay doors according to an embodiment in a closed position. Specifically, FIG. 1 depicts a portion of a fuselage 105 having an aperture 106 formed therethrough to accommodate a weapon bay door 110 comprising a forward door 110F connected via a hinge or similar mechanism to a rearward door 110R. Each of the two doors 110F/110R has a leading edge, a trailing edge, a left side, and a right side. Each of the two doors 110F/110R has a respective outer surface 110F-OS/110R-OS which is flush with an outer surface 105-OS of the fuselage 105 of the airframe when the weapon bay door 110 is closed to thereby reduce aerodynamic drag.

It is noted that forward door 110F is depicted as having a leading edge formed in accordance with a zig-zag pattern to break up radar return signals. The trailing edge of the forward door 110F is connected via a hinge or similar mechanism (not shown) to the leading edge of the rearward door 110R.

FIG. 2 illustrates the pair of cooperating weapon bay doors of FIG. 1. Specifically, FIG. 2 is a perspective view of the two doors 110F/110R, wherein each of the doors has associated with it four rollers (two on each side, one toward the leading edge and one toward the trailing edge). Each of the four rollers of the forward door 110F comprise larger rollers 210. The two leading edge rollers of the rearward door 110R also comprise larger rollers 210, while the two trailing edge rollers of the rearward door 110R comprise smaller rollers 220. As will be discussed in more detail below, the larger rollers are sized to fit into a first set of guiderails when the doors are retracted or opened, while the smaller rollers are sized to fit into a second set of guiderails when the doors are retracted or opened. The larger rollers 210 have a larger diameter than that of the smaller rollers 220.

Thus, as depicted in FIGS. 1-2, the weapon bay door 110 is configured to secure an aperture in an aircraft fuselage associated with a weapon bay and comprising a forward door hinged to a rearward door. Each of the two doors 110F/110R comprises a leading edge, a trailing edge, a left side, and a right side. Each of two doors 110F/110R has mounted thereon a pair of leading edge rollers and a pair of trailing edge rollers, the rearward door pair of trailing edge rollers have a smaller diameter than the other rollers. It is noted that rollers are depicted in specific positions with respect to the two doors 110F/110R, the rollers may be mounted to either the sides (edges) or inner surfaces of the two doors 110F/110R.

Various embodiments contemplate a sliding mechanism configured to retract the weapon bay door 110 toward the inside rear of the aircraft fuselage, the sliding mechanism comprising a first pair of guiderails configured to cooperate with the larger diameter roller pairs and a second pair of guiderails configured to only cooperate with the smaller diameter roller pair. The second guiderail pair is shaped to guide the pair of rearward door trailing edge rollers upward by an amount sufficient to raise the outer surface 110R-OS of the rearward door 110R into an interior space in the fuselage, and rearward by an amount sufficient to enable deployment of a weapon bay device.

The sliding mechanism may comprise a standard sliding door mechanism, such as one or more electric motors or hydraulic systems operably connected to, illustratively, the trailing edge of the rearward door 110R and configured in an opening mode of operation to pull the rearward door 110R toward the rear of the fuselage until the weapon door 110 is open, and in a closing mode of operation to push the rearward door 110R toward the front of the fuselage until the weapon door 110 is closed.

Embodiments of a sliding mechanism will now be discussed with respect to FIGS. 3-6.

Figure 3:
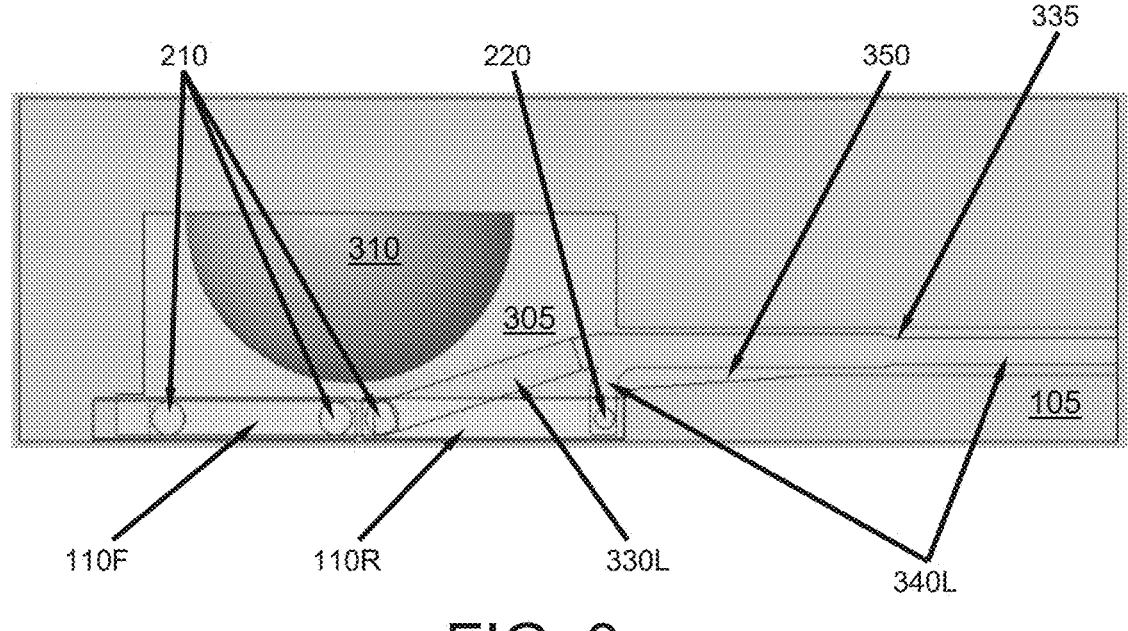
FIG. 3 depicts a detailed side view of a weapon bay door mechanism according to an embodiment in a fully closed position.

FIG. 3 depicts a detailed side view of a weapon bay door mechanism according to an embodiment in a fully closed position. Specifically, FIG. 3 depicts a detailed side view of the pair of cooperating weapon bay doors of FIG. 1 in a fully closed position within a fuselage 105 and securely storing within a weapon bay 305 an exemplary optical/laser/directed energy weapon 310.

As depicted in FIG. 3, the weapon 310 is fixedly mounted within the weapon bay 305. In these embodiments, the weapon may deliver line of sight optical or other energy to targets from within the weapon bay 305 in accordance with available viewing angles as limited by the mounting location of the weapon 310 with respect to the aperture 106 within the aircraft fuselage 105.

The weapon 310 may also be mounted upon a turret 605 (see FIG. 6), wherein the turret 605 is mounted within the weapon bay 305 but operable to be extended such that the weapon 310 passes through the fuselage aperture 106 associated with the weapon bay 305. In these embodiments, the weapon 310 may deliver line of sight optical or other energy to targets accordance with a substantially hemispherical field of view under the aircraft fuselage 105.

Referring to FIG. 3, it can be seen that in the closed position, the outer surface 110F-OS of the forward door 110F and the outer surface 110R-OS of the rearward door 110R are flush with the outer surface 105-OS of the fuselage 105.

FIG. 3 depicts a set of first or larger guiderails 330 which are sized to accommodate the passing therethrough of the larger rollers 210; namely, a left side larger guiderail 330L and a right side larger guiderail 330R (not visible in this view), where the larger guiderails 330 are configured to receive and guide therethrough the two leading edge large rollers of the rearward door 110R and the four large rollers of the forward door 110F. The larger guiderails 330 accommodate the passing of the larger rollers 210 therethrough toward the rear of the fuselage 105 when opening the weapon bay door 110, and toward the front of the fuselage 105 when closing the weapon bay door 110.

FIG. 3 depicts a set of smaller guiderails 340 which are sized to accommodate the passing therethrough of the smaller rollers 220; namely, a left side smaller guiderail 340L and a right side smaller guiderail 340R (not visible in this view), where the smaller guiderails 340 are configured to receive and guide therethrough the two trailing edge rollers of the rearward door 110R. The smaller guiderails 340 accommodate the passing of the smaller rollers 220 therethrough toward the rear of the fuselage 105 when opening the weapon bay door 110, and toward the front of the fuselage 105 when closing the weapon bay door 110.

The height 332 of the larger guiderails 330 is sized to accommodate the diameter of the larger rollers 210. The height 342 of the smaller guiderails 340, which is smaller than the height 332 of the larger guiderails, is sized to accommodate the diameter of the smaller rollers 220, and therefore to not accommodate the diameter of the larger rollers 210. As depicted, the smaller guiderails 340 extend beyond the larger guiderails 330 toward the rear of the fuselage.

In some embodiments, a middle portion of the smaller guiderails 340 is located within the larger guiderails 330, wherein a front portion of the smaller guiderails 340 holds the smaller rollers 220 of rearward door 110R in the closed position, and the rear portion of smaller guiderails 340 holds the smaller rollers 220 of rearward door 110R in the open position. As depicted in FIG. 3, the larger guiderails 330 including the smaller guiderails 340 tapers to the rear portion of the smaller guiderails 340 at taper point 335.

When the weapon bay door 110 is in the closed position the larger rollers 210 and smaller rollers 220 are in their lowest positions of their respective guiderails 330/340.

During opening of the weapon bay door 110, the trailing edge of the rearward door 110R is guided sharply upward (inward with respect to the fuselage 105) and then rearward as depicted by the second guiderail 340, while the leading edge of the rearward door 110R and the forward door 110F are guided upward and inward at a less sever angle.

Optionally provided is a slanted surface 350 along the inner surface of the aircraft along and under the guiderails 330/340 to prevent the outer surface 110R-OS of the rearward door 110R from jamming against the inner surface of the aircraft as it slides backwards into its fully-open rest position at the smaller guiderail 340.

Figure 4:
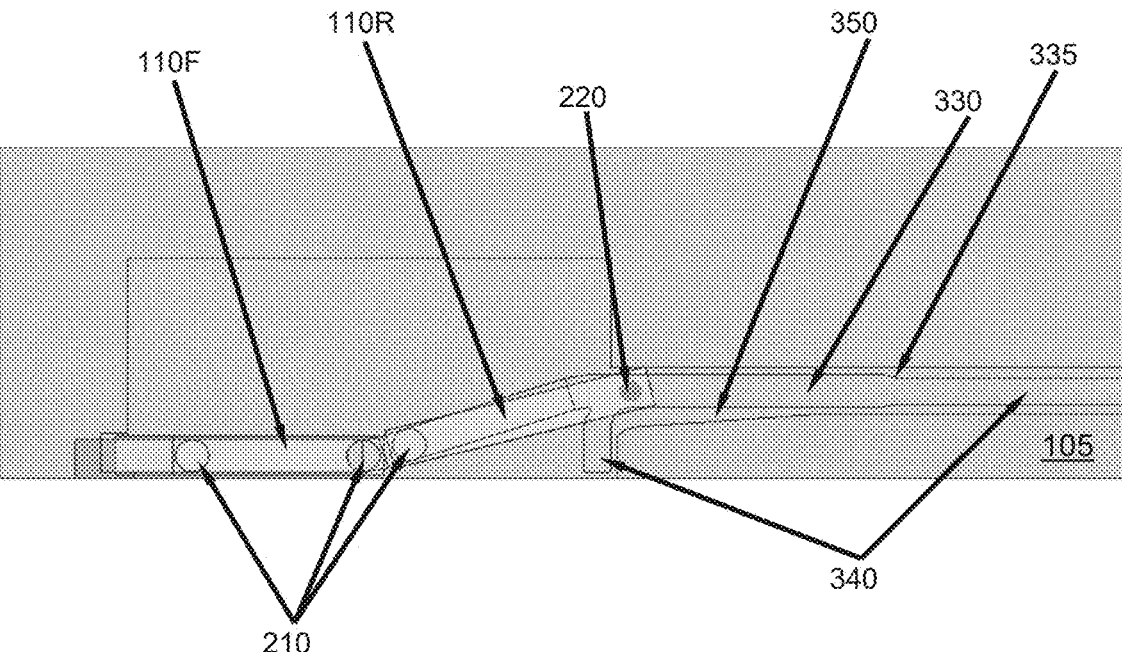
FIG. 4 depicts a detailed side view of a weapon bay door mechanism according to an embodiment in a partially opened position.

FIG. 4 depicts a detailed side view of a weapon bay door mechanism according to an embodiment in a partially opened position. Specifically, FIG. 4 depicts a view substantially similar to that discussed above with respect to FIG. 3, except that the process of opening the weapon bay door 100 has been initiated and the two doors 110F/110R have been partially retracted toward the rear of the fuselage 105.

Referring to FIG. 4, it can be seen that the smaller rollers 220 of rearward door 110R has moved upwards from the lowest position of smaller guiderail 340 (as depicted and described with respect to FIG. 3), thereby moving the rearward door 110R upward and toward the rear of the fuselage 105. The smaller rollers 220 (i.e., the rearward door 110R) are moved upward in smaller guiderail 340 whereupon they are pulled into larger guiderail 330, which extends sufficiently towards the rear of the fuselage 105 to receive larger rollers 210 and smaller rollers 220 a distance sufficient to enable the weapon bay door 110 to fully open.

Optionally, as noted above, FIG. 4 also depicts the slanted surface 350 along the inner surface of the aircraft along and under the guiderails 330/340 to prevent the outer surface 110R-OS of the rearward door 110R from jamming against the inner surface of the aircraft as it slides backwards into its fully-open rest position at the smaller guiderail 340.

Figure 5:
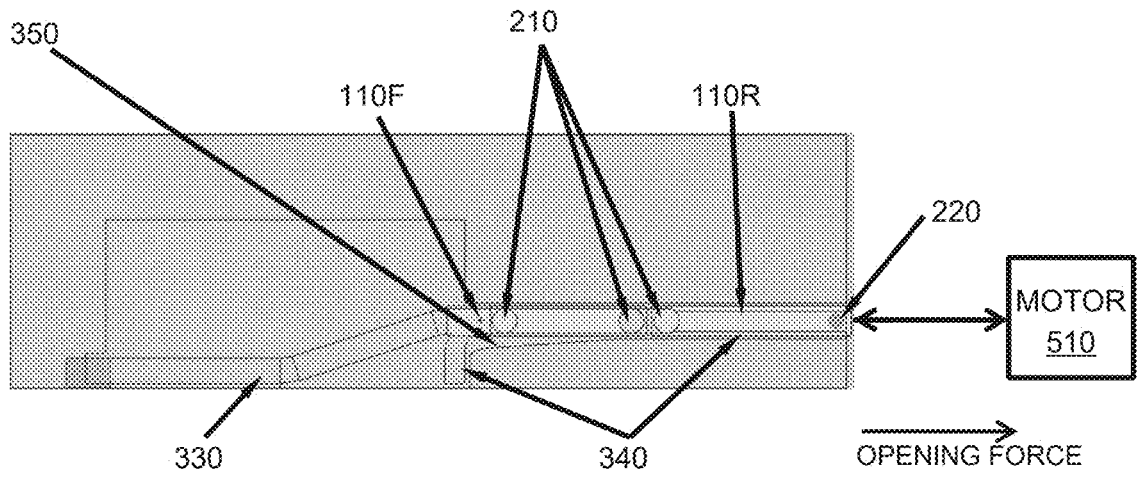
FIG. 5 depicts a detailed side view of a weapon bay door mechanism according to an embodiment in a fully opened position.

FIG. 5 depicts a detailed side view of a weapon bay door mechanism according to an embodiment in a fully opened position. Specifically, FIG. 5 depicts a view substantially similar to that discussed above with respect to FIGS. 3-4, except that the process of opening the weapon bay door 100 has been concluded and the two doors 110F/110R have been fully retracted toward the rear of the fuselage 105.

Referring to FIG. 5, it can be seen that the smaller rollers 220 of rearward door 110R have moved all the way to the rear of smaller guiderail 340, thereby moving the rearward door 110R all the way toward the rear of the fuselage 105, which in turn pulls the first door to its most rearward position (i.e., the larger rollers 210 of forward door 110F and leading edge of the rearward door 110R have moved toward their rearmost position in the larger guiderail 330). It is noted that one or more electric motors or hydraulic systems are depicted as operably connected to the rearward door 110R and configured to exert opening and closing force upon the rearward door 110R to slide the entire assembly toward the rear of the fuselage and back toward the front of the fuselage.

Figure 6:
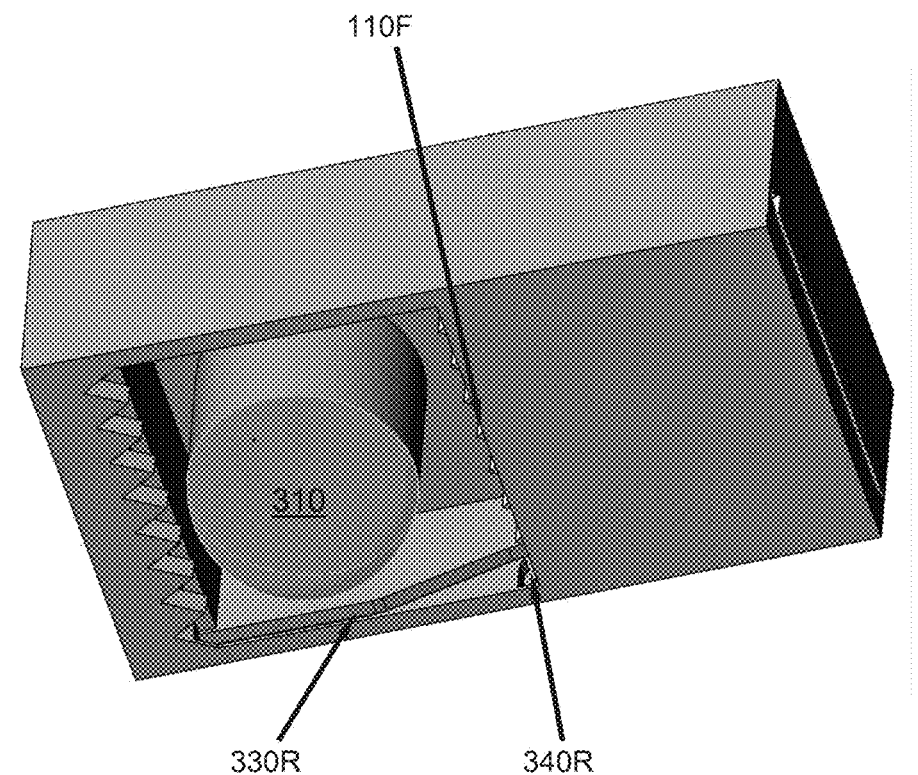
FIG. 6 depicts a weapon bay door in a fully opened position with an exemplary optical/laser turret assembly extended outside the aircraft.

FIG. 6 depicts a weapon bay door in a fully opened position with an exemplary optical/laser/directed energy turret assembly (turret 605 and weapon 310) extended outside the aircraft. Specifically, FIG. 6 is a perspective view of the weapon door 110 fully opened with a generic optical/laser/directed energy weapon 310 extended outside of the aircraft weapon bay via a turret 605. Forward door 110F and rearward door 110R are retracted and hidden within the aircraft to maintain its stealth capability and to reduce the aerodynamic drag. In addition, since the doors 110F/110R are concealed within the aircraft, the turret-extended weapon 310 has a 360° line of sight (or side-to-side view) of the surroundings beneath the aircraft. The larger guiderail 330 and smaller guiderail 340 are located within each side of the weapon bay, so that they are not exposed once the doors are closed. The right side larger 330R and right side smaller 340R guiderails are visible in FIG. 6.

Various embodiments may be implemented as a retrofit kit so as to be retrofitted into existing bomber and fighter weapon bay configurations. Such a retrofit kit includes, for each particular aircraft fuselage of interest, appropriately sized versions of each of the elements described above with respect to the various embodiments; namely, the doors 110F/110R, a set of first or larger guiderails 330L/330R, a set of second or smaller guiderails 340L/340R, larger rollers 210, smaller rollers 220, an electric motor or hydraulic mechanism 510 (if needed), and so on.

A retrofit weapon bay door mechanism kit according to an embodiment comprises: a forward door configured to be connected by a hinge to a rearward door to form thereby a weapon bay door to secure an aperture in an aircraft fuselage associated with a weapon bay, each of the forward and rearward doors comprising a leading edge, a trailing edge, a left side, and a right side; three pairs of larger rollers and a pair of smaller rollers, the first and second pairs of larger rollers being configured for side-mounted thereon on the leading and trailing edge of the forward door, the third pair of larger rollers being configured for side-mounted thereon on the leading edge of the rearward door, and the pair of smaller rollers being configured for side-mounted thereon on the trailing edge of the rearward door; a sliding mechanism configured to be coupled to the inside of the aircraft fuselage so as to retract thereby the weapon bay door toward the inside rear of the aircraft fuselage, the sliding mechanism comprising a first pair of guiderails configured to cooperate with the larger diameter roller pairs and a second pair of guiderails configured to only cooperate with the smaller diameter roller pair; wherein the second guiderail pair is shaped to guide the pair of rearward door trailing edge rollers upward by an amount sufficient to raise the outer surface 110R-OS of the rearward door into an interior space in the fuselage and rearward by an amount sufficient to enable deployment of a weapon bay device.

The various weapon bay door embodiments depicted above provide various advantages for stealth aircraft over prior weapon bay door designs, including:

Sliding the weapon bay doors 110 fully into the aircraft fuselage enables an optical/laser/directed energy weapon mounted on a turret to be extended therethrough to have a 360° line of sight (or side-to-side view) of the surroundings beneath the aircraft.

Since the weapon bay doors 110 are fully retracted within the fuselage, aerodynamics drag is reduced once the weapon bay is opened, as opposed the conventional weapon door configuration which is suspended outside the aircraft.

The disclosed weapon bay door mechanism is fully compatible with the existing zig-zag edges of weapon bays to maintain the aircraft's stealth capability.

The disclosed weapon bay door mechanism may be retrofitted into existing bomber and fighter weapon bay configurations.

Various modifications may be made to the systems, methods, apparatus, mechanisms, techniques and portions thereof described herein with respect to the various figures, such modifications being contemplated as being within the scope of the invention. For example, while a specific order of steps or arrangement of functional elements is presented in the various embodiments described herein, various other orders/arrangements of steps or functional elements may be utilized within the context of the various embodiments. Further, while modifications to embodiments may be discussed individually, various embodiments may use multiple modifications contemporaneously or in sequence, compound modifications and the like.

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof. As such, the appropriate scope of the invention is to be determined according to the claims.

What is claimed is:

1. A weapon bay door mechanism, comprising:
a weapon bay door configured to secure an aperture in an aircraft fuselage associated with a weapon bay and comprising a forward door hinged to a rearward door, each of the forward and rearward doors comprising a leading edge, a trailing edge, a left side, a right side, and an outer surface;
each of the doors having side-mounted thereon a pair of leading edge rollers and a pair of trailing edge rollers, the rearward door pair of trailing edge rollers have a smaller diameter than the other rollers;
a sliding mechanism configured to retract the weapon bay door toward the inside rear of the aircraft fuselage, the sliding mechanism comprising a first pair of guiderails configured to cooperate with the larger diameter roller pairs and a second pair of guiderails configured to only cooperate with the smaller diameter roller pair;
wherein the second guiderail pair is shaped to guide the pair of rearward door trailing edge rollers upward by an amount sufficient to raise the outer surface of the rearward door into an interior space in the fuselage and rearward by an amount sufficient to enable deployment of a weapon bay device.

2. The weapon bay door mechanism of claim 1, wherein deployment of a weapon bay device comprises enabling operation of an optical device mounted within the weapon bay.

3. The weapon bay door mechanism of claim 2, wherein the optical device is mounted upon a turret within the weapon bay, wherein deployment of a weapon bay device comprises extending the turret through the aperture.

4. The weapon bay door mechanism of claim 1, wherein deployment of a weapon bay device comprises enabling operation of an directed energy device mounted within the weapon bay.

5. The weapon bay door mechanism of claim 4, wherein the directed energy device is mounted upon a turret within the weapon bay, wherein deployment of a weapon bay device comprises extending the turret through the aperture.

6. The weapon bay door mechanism of claim 1, wherein the leading edge of the forward door comprises a zig-zag pattern.

7. The weapon bay door mechanism of claim 1, wherein in a closed position the outer surfaces of the forward door and rearward door are flush with an outer surface of the aircraft fuselage.

8. A retrofit weapon bay door mechanism kit, the kit comprising:

a forward door configured to be connected by a hinge to a rearward door to form thereby a weapon bay door to secure an aperture in an aircraft fuselage associated with a weapon bay, each of the forward and rearward doors comprising a leading edge, a trailing edge, a left side, a right side, and an outer surface;

three pairs of larger rollers and a pair of smaller rollers, the first and second pairs of larger rollers being configured for side-mounted thereon on the leading and trailing edge of the forward door, the third pair of larger rollers being configured for side-mounted thereon on the leading edge of the rearward door, and the pair of smaller rollers being configured for side-mounted thereon on the trailing edge of the rearward door;

a sliding mechanism configured to be coupled to the inside of the aircraft fuselage so as to retract thereby the weapon bay door toward the inside rear of the aircraft fuselage, the sliding mechanism comprising a first pair of guiderails configured to cooperate with the larger diameter roller pairs and a second pair of guiderails configured to only cooperate with the smaller diameter roller pair;

wherein the second guiderail pair is shaped to guide the pair of rearward door trailing edge rollers upward by an amount sufficient to raise the outer surface of the rearward door into an interior space in the fuselage and rearward by an amount sufficient to enable deployment of a weapon bay device.

9. The retrofit weapon bay door mechanism kit of claim 8, wherein deployment of a weapon bay device comprises enabling operation of an optical device mounted within the weapon bay.

10. The retrofit weapon bay door mechanism kit of claim 9, wherein the optical device is mounted upon a turret within the weapon bay, wherein deployment of a weapon bay device comprises extending the turret through the aperture.

11. The retrofit weapon bay door mechanism kit of claim 8, wherein deployment of a weapon bay device comprises enabling operation of an directed energy device mounted within the weapon bay.

12. The retrofit weapon bay door mechanism kit of claim 11, wherein the directed energy device is mounted upon a turret within the weapon bay, wherein deployment of a weapon bay device comprises extending the turret through the aperture.

13. The retrofit weapon bay door mechanism kit of claim 8, wherein the leading edge of the forward door comprises a zig-zag pattern.

14. The retrofit weapon bay door mechanism kit of claim 8, wherein in a closed position the outer surfaces of the forward door and rearward door are flush with an outer surface of the aircraft fuselage.

\* \* \* \* \*